US009580248B2

United States Patent
Hasman et al.

(10) Patent No.: US 9,580,248 B2
(45) Date of Patent: Feb. 28, 2017

(54) ONE-TO MANY PUT SEQUENCE OPTIMIZATION

(71) Applicant: Dematic Corp., Grand Rapids, MI (US)

(72) Inventors: Anthony W. Hasman, Comstock Park, MI (US); Fredrick D. Herlacher, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 323 days.

(21) Appl. No.: 14/293,576

(22) Filed: Jun. 2, 2014

(65) Prior Publication Data

US 2015/0086304 A1    Mar. 26, 2015

Related U.S. Application Data

(60) Provisional application No. 61/882,784, filed on Sep. 26, 2013, provisional application No. 61/912,286, filed on Dec. 5, 2013.

(51) Int. Cl.
*G06F 7/00* (2006.01)
*B65G 1/137* (2006.01)
*G06Q 10/08* (2012.01)

(52) U.S. Cl.
CPC ......... *B65G 1/1378* (2013.01); *G06Q 10/087* (2013.01)

(58) Field of Classification Search
USPC ....................................................... 700/216
See application file for complete search history.

(56) References Cited

U.S. PATENT DOCUMENTS 5,593,269 A * 1/1997 Bernard, II .......... B65G 1/0485
                                                        198/469.1
7,516,848 B1 * 4/2009 Shakes ..................... B07C 5/38
                                                        209/34
(Continued)

FOREIGN PATENT DOCUMENTS

AT          511860 A2    3/2013
AT          511868 A1    3/2013
(Continued)

OTHER PUBLICATIONS

International Preliminary Report on Patentability from corresponding Patent Cooperation Treaty Patent Application No. PCT/US2014/040714 issued Apr. 7, 2016.
(Continued)

*Primary Examiner* — Kyle Logan
(74) *Attorney, Agent, or Firm* — Gardner, Linn, Burkhart & Flory, LLP

(57) ABSTRACT

A method and system for fulfilling orders includes establishing a queue of orders that are available to be filled, each order in the queue containing at least one unique item type. An order from the order queue is selected and opened as a first order. Another order from the order queue is selected and opened as a second order. Inventory containers each having a unique item type for at least one of the orders are delivered and an operator picks the unique item type from the inventory container. The orders are assembled at order assembly locations that are a particular distance from the operator. The orders are selected and/or the assembly locations assigned in a manner that improves order fulfillment productivity, such as by reducing order fulfillment time, reducing operator travel distance, and the like.

28 Claims, 6 Drawing Sheets

(56) References Cited

U.S. PATENT DOCUMENTS

| | | |
|---|---|---|
| 8,082,059 B2 | 12/2011 | Schaefer et al. |
| 8,311,902 B2 | 11/2012 | Mountz et al. |
| 8,335,585 B2 | 12/2012 | Hansl et al. |
| 8,396,585 B2 | 3/2013 | Antony et al. |
| 8,433,437 B1 | 4/2013 | Shakes et al. |
| 8,483,869 B2 | 7/2013 | Wurman et al. |
| 8,560,114 B2 | 10/2013 | Suess et al. |
| 8,571,702 B1 | 10/2013 | Haake et al. |
| 8,700,502 B2 | 4/2014 | Mountz et al. |
| 8,713,899 B2 | 5/2014 | Hortig et al. |
| 2008/0167884 A1* | 7/2008 | Mountz .......... G06Q 10/087 705/29 |
| 2009/0288996 A1 | 11/2009 | Shafer |
| 2011/0130869 A1 | 6/2011 | Linge et al. |
| 2012/0101627 A1 | 4/2012 | Lert |
| 2013/0054005 A1 | 2/2013 | Stevens et al. |
| 2013/0073076 A1 | 3/2013 | Mathi et al. |

FOREIGN PATENT DOCUMENTS

| | | |
|---|---|---|
| AT | 511868 A9 | 6/2013 |
| AT | 512338 A1 | 7/2013 |
| AT | 13355 U1 | 11/2013 |
| DE | 102009032406 A1 | 1/2011 |
| EP | 2050695 A1 | 4/2009 |
| EP | 2089295 B1 | 5/2013 |
| EP | 2607271 A1 | 6/2013 |
| EP | 2050695 B1 | 9/2013 |
| WO | 2008061744 A1 | 5/2008 |
| WO | 2011113053 A1 | 9/2011 |
| WO | 2013033744 A1 | 3/2013 |
| WO | 2013033745 A1 | 3/2013 |
| WO | 2013090962 A1 | 6/2013 |
| WO | 2013090969 A1 | 6/2013 |

OTHER PUBLICATIONS

International Search Report (Form PCT/ISA/210) and Written Opinion of the International Searching Authority (Form PCT/ISA/237) from corresponding Patent Cooperation Treaty Application No. PCT/US2014/040714, mailed Oct. 23, 2014.

* cited by examiner

ONE-TO MANY PUT SEQUENCE OPTIMIZATION

CROSS REFERENCE TO RELATED APPLICATION

This is claims priority from U.S. patent application Ser. No. 61/882,784, filed on Sep. 26, 2013, and U.S. provisional patent application Ser. No. 61/912,286, filed on Dec. 5, 2013, the disclosures of which are hereby incorporated herein by reference.

BACKGROUND OF THE INVENTION

The present invention is directed to fulfillment of customer orders and, in particular, to fulfillment of customer orders utilizing the one-to-many put sequence procedure. While the invention is illustrated utilizing split-case processing, it has applicability to other processes, such as full case pallet assembly, and the like.

One-to-many put sequence processing typically uses a human operator to retrieve one or more homogeneous items having the same item identifier, such as a stock-keeping unit (SKU) from a container, referred to as an "inventory container." The item(s) is matched with a customer order requiring that item(s). In a one-to-many put sequence, multiple customer orders are assembled concurrently, each at a separate location in a put station.

Examples of such put stations are put-walls in which a customer order is assembled at a location on the put-wall. Also, a goods-to-person pick station in which inventory containers are automatically brought to the operator and removed when the item(s) have been removed from the container. Customer orders are each assembled at a specific location in an order buffer usually in order containers. When an order container for an order is full or the order is complete, an empty container is substituted until that container is full, and so-on. Whether a put-wall or a goods-to-person pick station is used, an operator must move, such as by walking, between the inventory container and the order container. The further the operator must move and the greater the number of item placements, the longer it takes the operator to fill an order and places additional workload on the operator.

Although the operator is typically a human, the picking activity, as well as the supplying and removal of containers, is guided by a computer system that determiners which orders are to be opened, which inventory containers are to be supplied, when an order is to be closed, and the like. Also, it is possible to utilize automated picking equipment in which a robot is used to do the picking.

SUMMARY OF THE INVENTION

The present invention provides techniques for enhancing efficiency of order fulfillment and improving ergonomics, such as by completing customer orders quicker and reducing the amount of movement, such as walking, required by the operator. Various aspects of the invention can be used separately or together.

A method and system for fulfilling orders, according to an aspect of the invention, includes establishing a queue of orders that are available to be filled, each order in the queue containing at least one unique item type. An order from the order queue is selected and opened as a first order. Another order from the order queue is selected and opened as a second order. Inventory containers each having a unique item type for at least one of the orders are delivered to an operator inventory container location and an operator picks the unique item type from the inventory container. The orders are assembled at order assembly locations that are a particular distance from the operator inventory container location. The orders are selected and/or the assembly locations assigned in a manner that improves order fulfillment productivity.

The inventory containers may be delivered and the orders assembled at a one-to-many put station having an operator inventory container location and a plurality of customer order assembly locations with least some of said locations separated a different distance from the operator inventory container location. The put station may be a goods-to-person pick station.

The inventory containers may be stored in a buffer and delivered from the buffer when an order requiring the unique item type is opened. The buffer may be an automated warehouse. Both the orders selected and the assembly locations assigned may be in a manner that improves order fulfillment productivity, such as by reducing travel.

A method and system for fulfilling orders, according to another aspect of the invention, includes establishing a queue of orders that are available to be filled, each order in the queue containing at least one unique item type and selecting an order from the order queue and opening that order as a first order. An inventory container is delivered having a first unique item type for the first order, and at least one first unique item type is picked from the inventory container and placed with the first order. A second order is selected from the order queue and opened as a function of the second order requiring the first unique item type. At least one item of the first unique item type is picked from the inventory container and placed with the second order.

Placing of the at least one first unique item type with the first order may include placing the first unique item type in a first order container and the placing of the at least one first unique item type with the second order may include placing the first unique item type in a second order container. A second inventory container may be delivered having a second unique item type for the first and/or second orders and at least one second unique item type picked from the second inventory container and placed with the first and/or second order. A third order is selected from the order queue as a function of a third order requiring the second unique item type and opened. At least one of the second unique item types is picked from the second inventory container and placed with the third order. These may be repeated for the remaining unique item types in the first order and then the first order is closed.

The first order may be designated as a primary order and the second and subsequent orders as a secondary order while said first order is open and another order is designated as the primary order when said first order has been closed. The highest priority order may be designated the primary order when the first order has been closed. The highest priority order may either already have been opened or still in the queue. The primary order may be filled in a location more convenient to a picker inventory container location and the secondary order in another location that is less convenient to the picker inventory container location than the more convenient location. The second order may be moved to the location more convenient to the picker inventory container location when the second order is designated the primary order. The second order may be filled to multiple order containers, and the second order moved by positioning subsequent order containers at the location more convenient to the picker when one of said order containers is complete and a more convenient location is available.

The picker may be a human and the location more convenient is a location closer to the picker inventory container location. The orders may be filled at a one-to-many put station. The put station may be a mechanically assisted goods-to-person pick station. The inventory containers may be stored in a buffer and delivered from the buffer when an order requiring the unique item type is selected. The buffer may be an automated warehouse.

A method and system for fulfilling orders at a one-to-many put station having an operator position and a plurality of customer order assembly locations, each of said locations being separated from the operator. A queue is established of orders that are available to be filled, each order in the queue containing at least one unique item type. A first order is selected from the order queue and opened as a primary order. The primary order is assembled at an order assembly location that is closest to an operator inventory container location. An inventory container having a first unique item type for the primary order is delivered to the inventory container location and at least one first unique item type from the inventory container placed with the first order. A second order is selected from the order queue and opened as a secondary order. The secondary order is assembled at an order assembly location that is not closest to the operator inventory container location. When the first order is complete, the second order is designated as the primary order and further assembled in the assembly location that is closest to the operator inventory container location.

The second order may be filled to multiple order containers and moved by positioning subsequent order containers at the assembly location that is closest to the operator inventory container location when one of the order containers is complete. The put station may be a mechanically assisted goods-to-person pick station. The inventory containers may be stored in a buffer and delivered from the buffer when an order requiring the unique item type is selected. The buffer may be an automated warehouse.

These and other objects, advantages and features of this invention will become apparent upon review of the following specification in conjunction with the drawings.

DESCRIPTION OF THE PREFERRED EMBODIMENT

Figure 1:
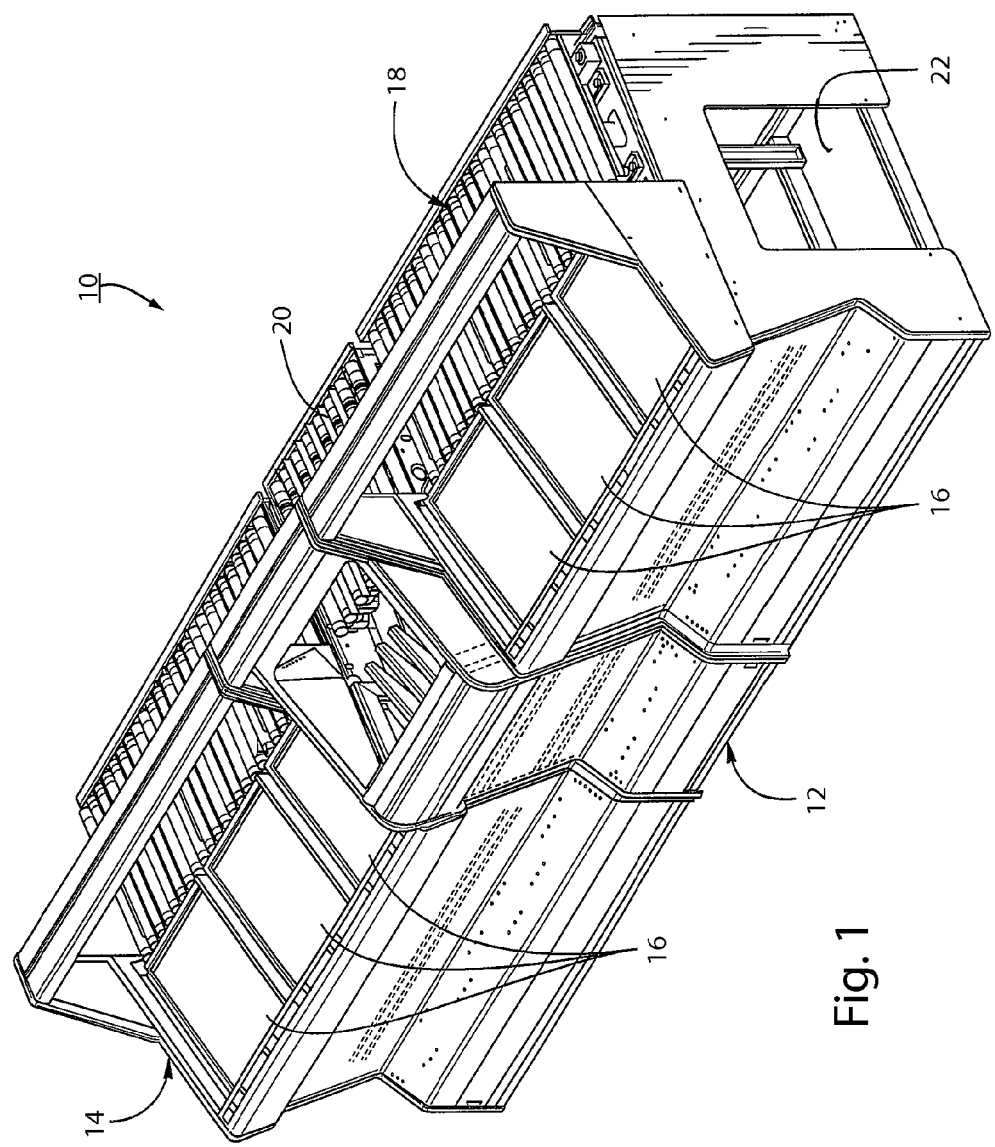
FIG. 1 is a perspective view of a goods-to-person pick station that is useful with embodiments of the invention.
Figure 2:
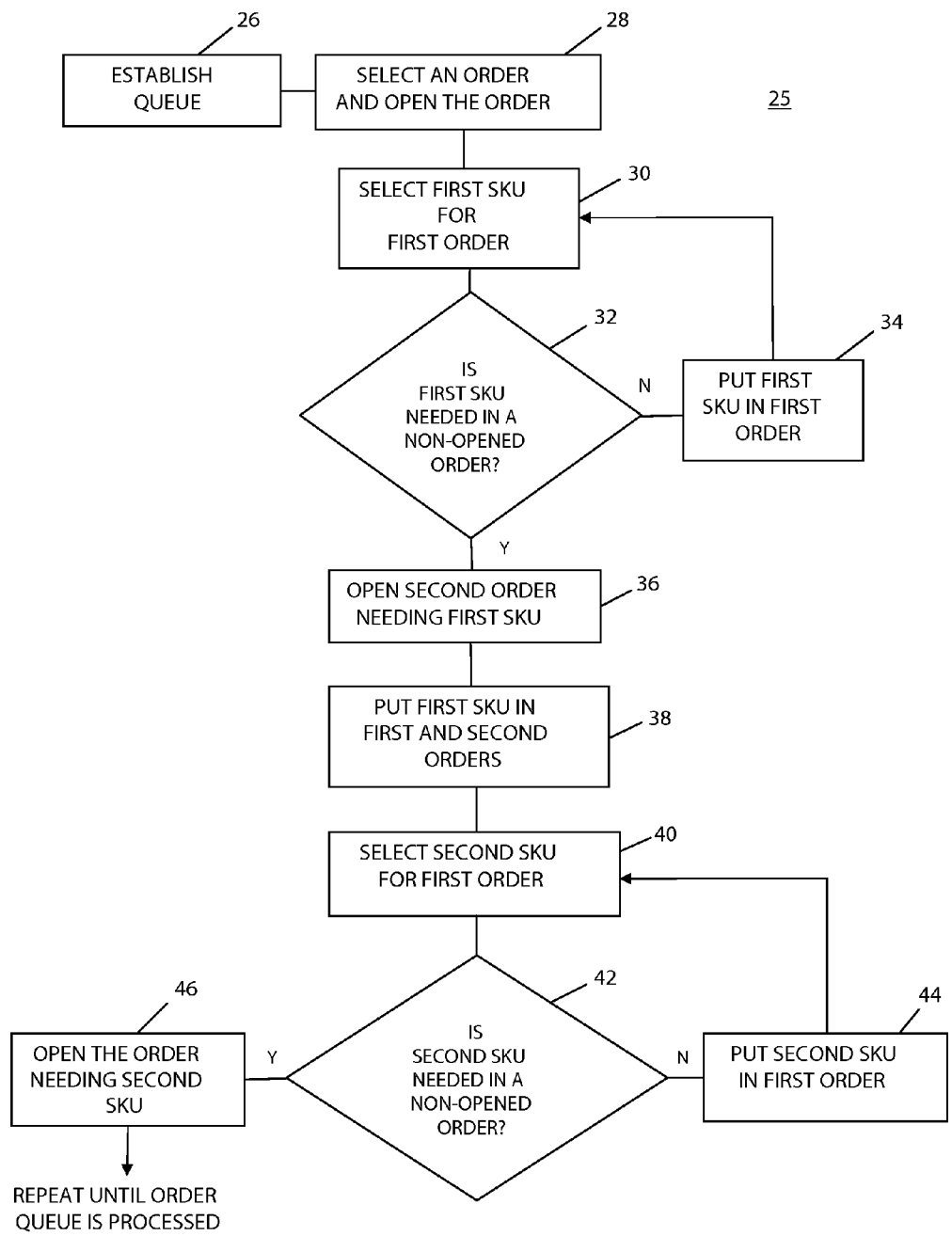
FIG. 2 is a process flow diagram of an order fulfillment method, according to an embodiment of the invention.
Figure 3:
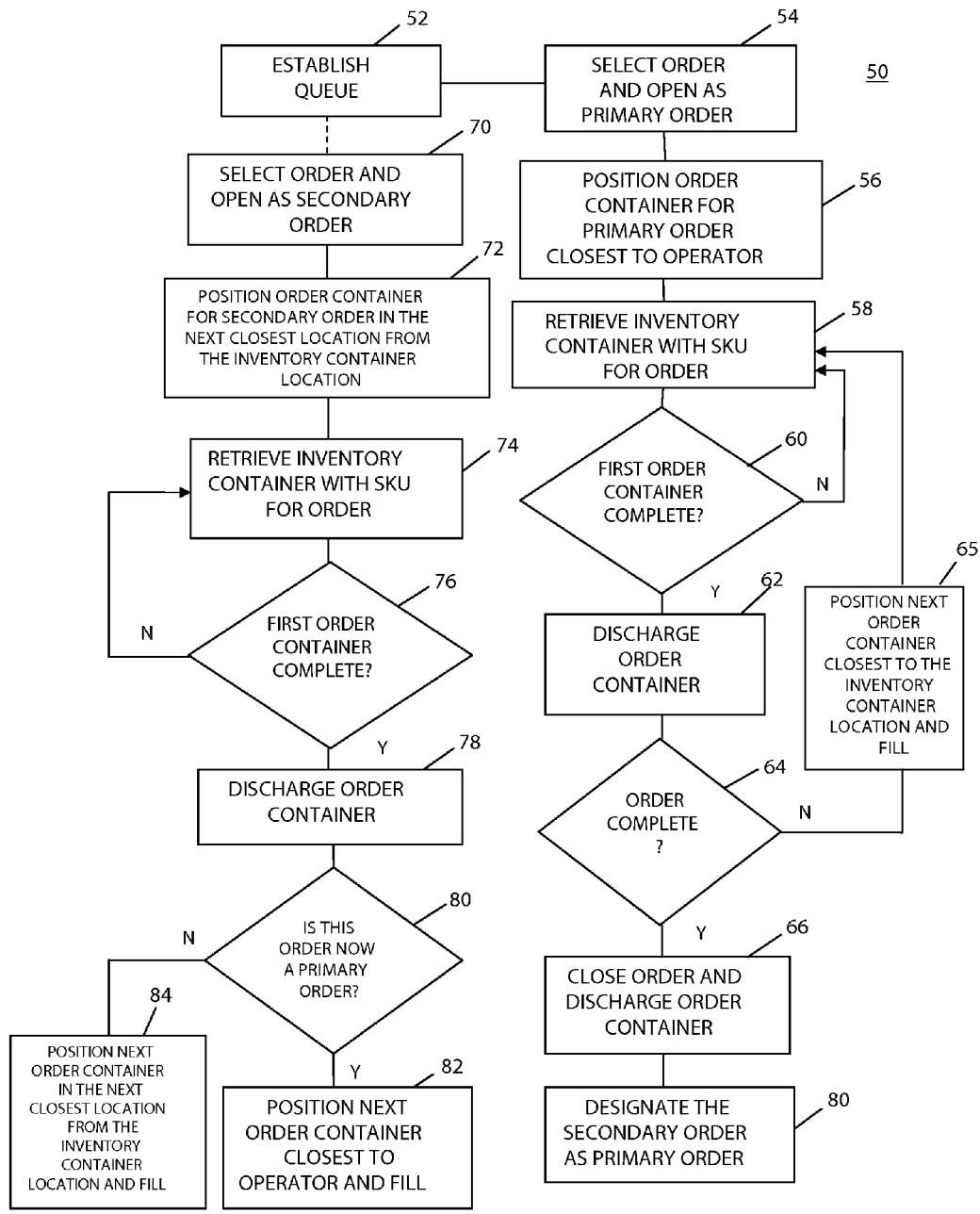
FIG. 3 is a process flow diagram of an order fulfillment method, according to another embodiment of the invention.

Referring now to the drawings and the illustrative embodiments depicted therein, an example of a one-to-many put station that is useful with embodiments disclosed herein is a goods-to-person pick station 10 having an inventory supply pathway including an inventory container item lift 12 that supplies inventory containers to an operator (not shown) who removes item(s) from the inventory container and places the item(s) in various order containers positioned along an order buffer 14 made up of a plurality of order assembly locations 16. As will be apparent by viewing FIG. 1, various order assembly locations 16 are more easily reached by an operator who stands in front of lift 12 to retrieve inventory item(s). Inventory containers are supplied via an inventory container supply passage 22 and may be received from a buffer (not shown), such as an automated warehouse, such as an automated storage and retrieval system known in the art. Completed order containers are moved onto a takeaway conveyor 18 to a packaging area, another buffer, or the like. Processed inventory containers, which are containers that are partially full or empty after having items removed by the operator, are removed by a processed inventory container takeaway 20 which may also deposit the processed inventory container on takeaway conveyor 18 or onto a separate takeaway line. The term "container" is not intended to be limiting and may be a tote, tray, box, package, or the like. Empty order containers may be manually placed at empty order assembly locations 16 by the operator or automatically supplied by conveyor 18, or other material handling device, and transferred to the empty order assembly location.

A method 25 of fulfilling orders begins with a warehouse management system (not shown) establishing a queue at 26 of orders that are available to be filled. A queue may be made up of all orders going to a particular retail establishment or a particular transport vehicle. Also, some orders are preferably filled before others in order to load the transport vehicle in a logical fashion, such as according to a delivery route sequence, according to order cutoff time frames, or to adjust the queue according to some other business metric, or the like. It should be understood that the queue may be dynamic with some orders added over time. Step 26 takes all such factors into account and only includes orders that are intended to be filled at the present time.

With the order queue established at 26, a first order is selected and opened at 28. This may be the first order in the queue or selected on some other criteria. The order is reviewed and the first item SKU listed for that order is examined. It is determined at 32 if the first SKU is needed in another order in queue 26 that is not opened. If not, then the first SKU item is retrieved from inventory, such as by retrieving the inventory container bearing that SKU. If the first SKU is needed in a non-opened order, that order is opened at 36 and the inventory container bearing the SKU for both orders is placed with the first and second orders at 38. With the second order now opened, a second SKU is selected for the first order at 40. It is determined at 42 if the second SKU is needed at an additional non-opened order. If not, then the second SKU is placed with the second order at 44. If it is determined at 42 that the second SKU for the second order is needed for another order, then that order is opened at 46, and the like, for additional orders in the queue until all available order locations are being used in the station.

Method 25 enhances a "duplicate pick" opportunity, where each inventory container has the possibility of servicing more than one order at a time. This reduces that traffic into and out of the inventory storage buffer and into and out of the goods-to-person pick station. It also may reduce the effort of the operator because the operator can place more items from each inventory container to open orders. While illustrated for use with a goods-to-person pick station, such method may be used with put walls and even automated pick systems. Also, although it may seem that such a technique will result in a large number of open orders at any time, simulations suggest it will not and may even reduce the number of open orders because orders are being completed quicker and thereby closed in addition to new orders being opened.

Another method 50 of fulfilling orders begins with a warehouse management system (not shown) establishing a queue at 52 of orders that are available to be filled in a similar fashion to the establishment of a queue 26 in method 25. The warehouse management system selects an order from the queue and opens that order at 54, which is designated a "primary" order. As a primary order, it is filled at an order assembly location that is most convenient to the operator, which typically will be a location closest to the operator inventory container location. The operator, or other method, positions empty order containers at the various order assembly locations 16 if the GTP station is manual or empty order containers may be automatically supplied, such as from complete order takeaway conveyor 18 using right angle transfer diverters if automated. In an automated system, the warehouse management system positions the primary order in the order assembly location 16 closest to the operator at 56 and retrieves an inventory container with an SKU for the primary order at 58.

It is then determined at 60 if the order container for the primary order is complete. If not, then additional inventory items are retrieved at 58 until the order container is complete. An order container is determined to be complete by accumulating information on the volume, or "cube" of the items, placed in that container and/or the weight of the items or manually closed by the operator. When it is determined that the primary order container is complete, it is manually or automatically displaced at 62 to complete order container takeaway conveyor 18. It is then determined at 64 if that order is complete. If not, then the operator is instructed to position an empty order container in the location closest to the operator at 65 and the new container is filled with inventory items (58) until that order container is complete (60) and discharged (62).

If it is determined at 64 that the primary order is complete, the final order container for that order is discharged at 66 to takeaway conveyor 18, that order is closed, and another order is designated as primary order at 80.

When the primary order is being processed, as previously described, the warehouse management system (WMS) occasionally opens new orders at 70 which are designated secondary orders. The secondary orders may be opened using the techniques set forth in method 25 or may be opened using other techniques. When the warehouse management system opens a secondary order, it instructs the operator to position an empty order container at 72 in order assembly location 16 next closest to the operator, if order container placement is manual. Otherwise, the system automatically supplies an empty order container to the order assembly location next closest to the operator. Inventory containers are retrieved at 74 with SKUs for the operator to place items into the order container for the secondary order until it is determined at 76 that the order container for the secondary order or is filled, such as by accumulated "cubes" or weight.

When it is determined at 76 that the order container for the secondary order is full, the order container is discharged at 78 to takeaway conveyor 18. It is then determined at 80 whether the designation of this order has been changed to that of a "primary" order. If not, then this order remains a secondary order and the operator is instructed to position an empty order container in the order assembly location 16 next closest to the operator and that container will receive SKUs from the operator until that container is full or the order is complete. If it is determined at 80 that the designation for this order has been changed to that of a "primary" order, then the operator is instructed to position an empty order container in the order assembly location 16 closest to the operator. The WMS then retrieves inventory items for that container and subsequent order containers will be placed in the location closest to the operator until the primary order is complete. At that time, another secondary order will be designated as "primary" and subsequent empty order containers placed in the order assembly location closest to the operator.

Figure 4A:
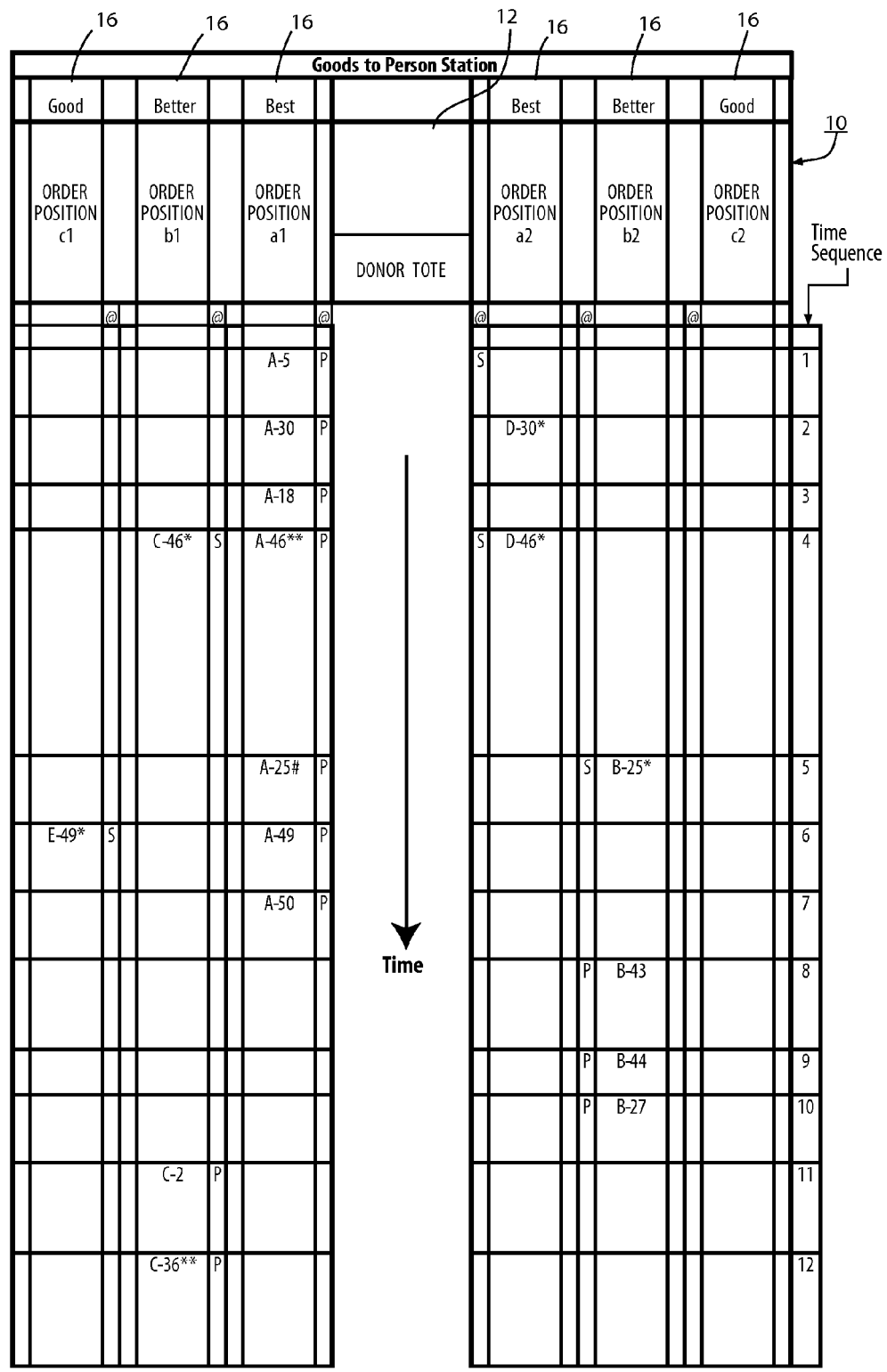
FIGS. 4a-4c are illustrations of order flow in the goods-to-person pick station of FIG. 1.
Figure 4B:
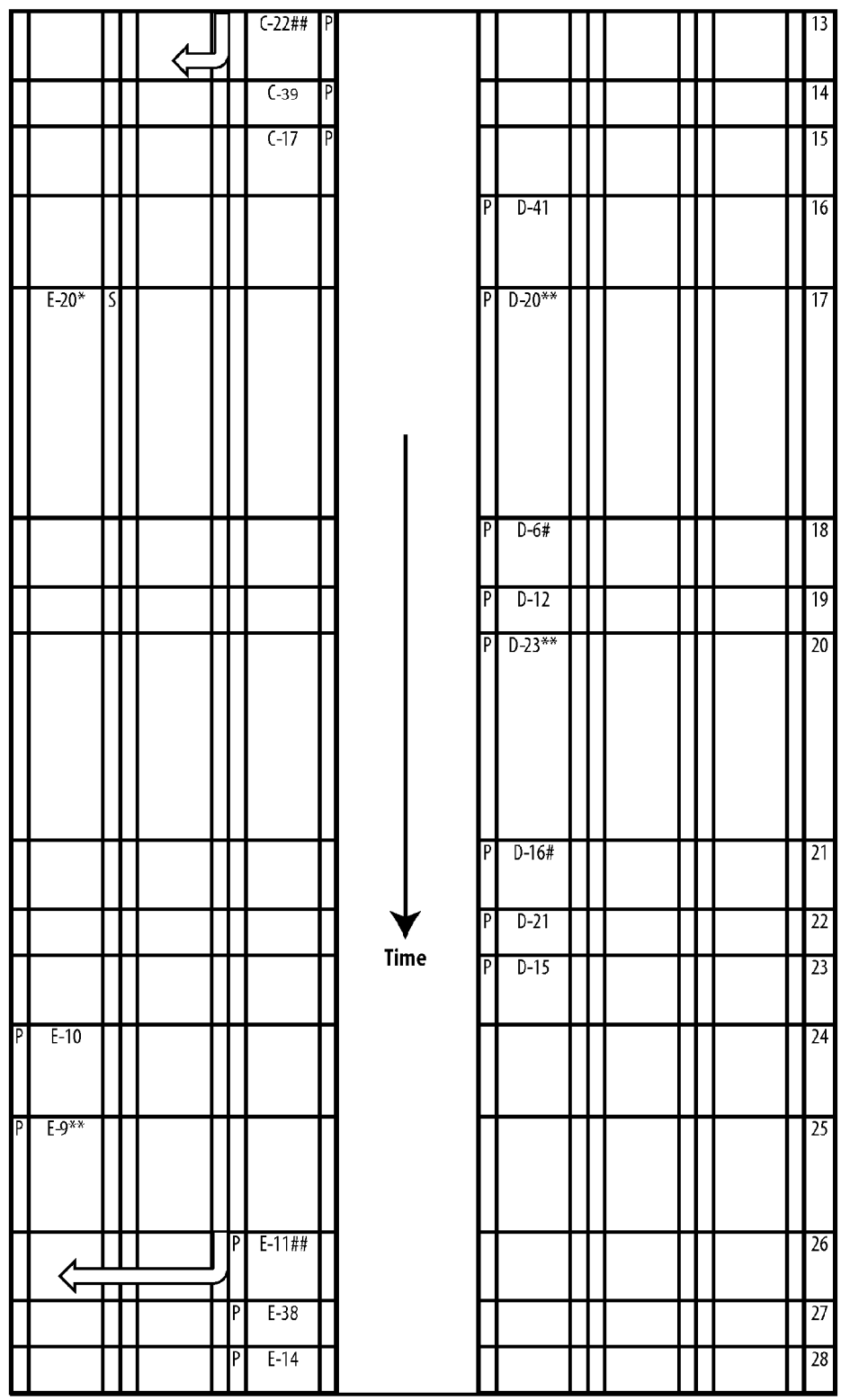
Figure 4C:
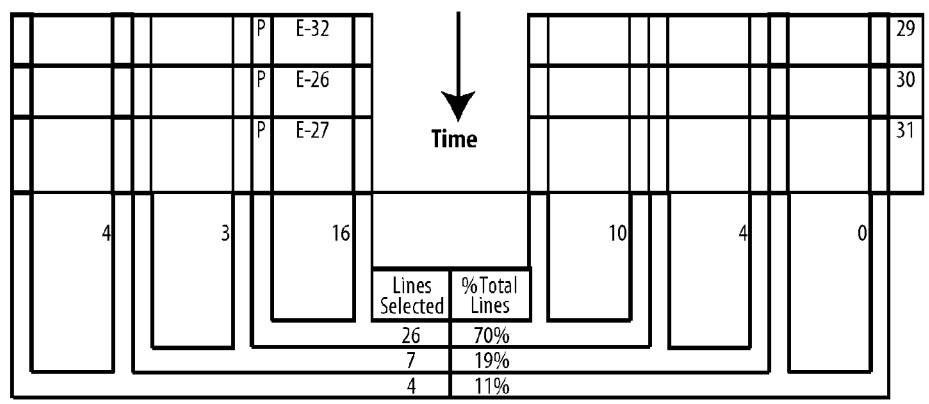

An example of operation of methods 25 and 50 will be illustrated with respect to FIGS. 4a-4c in which a goods-to-person (GTP) station 10 is illustrated with order assembly locations designated a1 and a2 as closest to the operator, positions b1 and b2 next closest to the operator, and positions c1 and c2 furthest from the operator. The operator is positioned at the inventory receptacle lift 12, which is identified as a "donor tote". The blocks below each order assembly locations illustrate order containers with inventory items being placed therein. The blocks below each order assembly represent events at subsequent intervals or periods of time, which are labeled at the right-hand column.

Referring to FIGS. 4a-4c, a primary order A is opened in the GTP in period 1 with the empty order container positioned at a1. When the SKU 5 inventory container arrives at the donor tote pick location, the operator will select the required quantity of items as directed by the WMS. The next inventory container SKU 30 is positioned to the donor tote location of GTP 10. Because an order D in the order queue also requires SKU 30, order D is opened as a secondary order and positioned in order position a2 which is the next most ergonomic location available in the GTP workstation. The operator deposits a required quantity of items from the SKU container to order D. Therefore, the inventory container bearing SKU 30 is used to place items into both order containers for orders A and D at time period 2. At the next time period 3, the inventory container for SKU 18 is retrieved and the operator instructed to deposit a given number of items to the order A container.

When SKU 46 arrives in time period 4, the operator will be prompted to assign another secondary order C, which also requires this item, to order position b1 and prompted to select the required items of SKU 46 for orders A, C and D. The operator will also be instructed by the WMS that the order container for order A is full and should be released from the GTP station. Since order A is not complete, the operator will be instructed to place an empty order container into order position a1 and continue the selection process for order A. At time period 5, a new order B will be opened and assigned to order position b2 since it requires SKU 25, which is also required for order A and position b2, and is the next most ergonomic location available in the GTP station. The operator will be prompted to select the requisite quantity of SKU 25 for the primary order A and secondary order B. At time period 6, a new order E will be opened and assigned to order position a3 since it requires SKU 49, which is also required for order A and position b3, and is now the next most ergonomic location available in the GTP station. The operator will be prompted to select SKU 49 for both primary order A and secondary order E. When SKU 50 arrives in period 7, the operator will be prompted to select the required number of SKU 50. The WMS will inform the operator that order A is complete and to complete the order closeout procedure and discharge the order container from position a1 to conveyor 18.

The operator will continue to fill order B with SKUs 43, 44 and 27 in time periods 8 through 10 and order C with SKUs 2 and 36 at time periods 11 and 12. At time period 12, the operator will be informed that the order container for order C is full and to close out that order container and discharge the order container to conveyor 18. The operator will then be instructed to place a new order container for order C into order position a1 for the remainder of the selection process of order C. Note that the WMS has changed the designation of order C from secondary to primary and the remainder of order C will be filled in position a1. This is because the WMS has now designated order C as primary when it closed order A. When inventory container for SKU 22 is delivered, the operator will select the required quantity of items and be instructed to deposit those items into the order container in position a1. The operator does not need to know that the location of order C has changed, only that an empty order container is to be placed at location a1 and SKU items are to be placed in it. Order C is complete at time period 15 and closed out.

Additional SKU inventory containers are retrieved at time periods 16 through 23 for order D. At time period 23, order D is complete and closed out. At time periods 24 and 25, additional SKUs 10 and 9 are added to order E which completes the order container for order E. The operator is instructed to discharge the order container for order E to conveyor 18 and to insert an empty order container in position a1 because order E has changed to primary status. The remainder of order E will be completed in position a1 most ergonomical to the operator.

Thus, it can be seen that orders are moved closer to the operator as primary orders are completed and the order container for the secondary order is closed. In the illustrated embodiment, the operator does not move any partially filled order containers, but only is instructed to place empty order containers in a position closer to the operator. In some applications, partially filled order containers may be moved. This saves time as the operator does not need to move as far to fill an order as well as reducing the effort required by the operator. Also, duplicate SKU picks are used to open new orders to thereby reduce the number of times that an inventory container is retrieved by the system and presented to the operator. While either method provides advantages, the optimal advantage is achieved when used together as illustrated herein.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of fulfilling orders, comprising:
    establishing a queue of orders that are available to be filled, each order in the queue containing at least one unique item type;
    selecting an order from the order queue and opening that order as a first order;
    selecting another order from the order queue and opening that order as a second order;
    delivering inventory containers each having at least one unique item type for at least one of the orders to an operator inventory container location and an operator picking the unique item type from the inventory container to assemble that order;
    assembling the orders at order assembly locations that are at different distances from the operator inventory container location; and
    assigning the assembly locations to the orders in a manner that improves order fulfillment productivity.

2. The method as claimed in claim 1 further including selecting the orders in a manner that improves order fulfillment productivity.

3. The method as claimed in claim 1 including delivering the inventory containers and assembling the orders at a one-to-many put station having an operator inventory container location and a plurality of customer order assembly locations, at least some of said assembly locations being a different distance from the operator inventory container location.

4. The method as claimed in claim 3 wherein the put station comprises a goods-to-person pick station.

5. The method as claimed in claim 1 wherein the inventory containers are stored in a buffer and delivered from the buffer when an order requiring the unique item type is opened.

6. The method as claimed in claim 5 wherein the buffer comprises an automated warehouse.

7. A method of fulfilling orders, comprising:
    a) establishing a queue of orders that are available to be filled, each order in the queue containing at least one unique item type;
    b) selecting an order from the order queue and opening that order as a first order;
    c) delivering an inventory container having a first unique item type for the first order and picking at least one of the first unique item types from the inventory container and placing the at least one first unique item type with the first order;
    d) selecting a second order from the order queue as a function of the second order requiring the first unique item type and opening the second order; and
    e) picking at least one of the first unique item types from the inventory container and placing the at least one first unique item type with the second order including designating the first order as a primary order and each of the second and subsequent orders as a secondary order while said first order is open and designating another order as the primary order when said first order has been closed.

8. The method as claimed in claim 7 including:
    delivering a second inventory container having a second unique item type for the first and/or second order and picking at least one said second unique item type from the second inventory container and picking at least one of the second unique item type from the second inventory container and placing the at least one second unique item type with the first and/or second orders;
    selecting a third order from the order queue as a function of the third order requiring the second unique item type and opening the third order; and
    picking at least one of the second unique item type from the second inventory container and placing the at least one second unique item type with the third order.

9. The method as claimed in claim 7 including repeating a) through e) for the remaining unique item types in the first order and then closing the first order.

10. The method as claimed in claim 7 wherein the placing of the at least one first unique item type with the first order comprises placing the first unique item type in a first order container and the placing of the at least one first unique item type with the second order comprises placing the first unique item type in a second order container.

11. The method as claimed in claim 10 including:
delivering a second inventory container having a second unique item type for the first and/or second order and picking at least one said second unique item type from the second inventory container and picking at least one of the second unique item type from the second inventory container and placing the at least one second unique item type with the first and/or second orders;
selecting a third order from the order queue as a function of the third order requiring the second unique item type and opening the third order; and
picking at least one of the second unique item type from the second inventory container and placing the at least one second unique item type with the third order.

12. This method as claimed in claim 7 including designating the highest priority order as the primary order when said first order has been closed.

13. The method as claimed in claim 12 wherein the highest priority order is opened or is in the queue.

14. The method as claimed in claim 7 including filling the primary order in a location more convenient to a picker inventory container location and the secondary order in another location that is less convenient to the picker inventory container location than the more convenient location.

15. The method as claimed in claim 14 wherein the picker is a human and wherein the location more convenient is a location closer to the picker inventory container location.

16. The method as claimed in claim 14 including moving the second order to the location more convenient to the picker inventory container location when the second order is designated the primary order.

17. The method as claimed in claim 16 wherein the second order is filled to multiple order containers and wherein the moving of the second order comprises positioning subsequent order containers at the location more convenient to the picker inventory container location when one of said order containers is complete.

18. The method as claimed in claim 14 wherein the orders are filled at a one-to-many put station.

19. The method as claimed in claim 18 wherein the put station comprises a mechanically assisted goods-to-person pick station.

20. The method as claimed in claim 7 wherein the inventory containers are stored in a buffer and delivered from the buffer when an order requiring the unique item type is selected.

21. The method as claimed in claim 20 wherein the buffer comprises an automated warehouse.

22. A method of fulfilling orders at a one-to-many put station having an operator inventory container location and a plurality of customer order assembly locations, each of said locations being separated from the operator, said method comprising:
a) establishing a queue of orders that are available to be filled, each order in the queue containing at least one unique item type;
b) selecting a first order from the order queue, opening the first order as a primary order and assembling the primary order at an order assembly location that is closest to an operator inventory container location;
c) delivering an inventory container having a first unique item type for the primary order to the inventory container location and picking at least one first unique item type from the inventory container and placing the at least one first unique item type with the first order;
d) selecting a second order from the order queue, opening the second order as a secondary order and at least partially assembling the secondary order at an order assembly location that is not closest to the operator inventory container location; and
e) when the first order is complete, designating the second order as the primary order and further assembling the second order in the assembly location that is closest to the operator inventory container location.

23. The method as claimed in claim 22 wherein the second order is filled to multiple order containers and wherein the moving of the second order comprises positioning subsequent order containers at the assembly location that is closest to the operator inventory container location when one of said order containers is complete.

24. The method as claimed in claim 23 wherein the put station comprises a mechanically assisted goods-to-person pick station.

25. The method as claimed in claim 22 wherein the inventory containers are stored in a buffer and delivered from the buffer when an order requiring the unique item type is selected.

26. The method as claimed in claim 25 wherein the buffer comprises an automated warehouse.

27. An order fulfillment system, comprising:
a warehouse management system that is programmed to establish a queue of orders that are available to be filled, each order in the queue containing at least one unique item type;
said warehouse management system being programmed to select an order from the order queue and open that order as a first order;
said warehouse management system being programmed to select another order from the order queue and opening that order as a second order;
a material handling system that is configured to deliver inventory containers each having at least one unique item type for at least one of the orders to an operator inventory container location, wherein said warehouse management system produces directions to an operator to pick the unique item type from the inventory container to assemble that order;
said warehouse management system programmed to provide instructions to the operator to assemble the orders at order assembly locations that are at different distances from the operator inventory container location; and
assigning the assembly locations to the orders by said warehouse management system in a manner that improves order fulfillment productivity.

28. An order fulfillment system, comprising:
a one-to-many put station having an operator inventory container location and a plurality of customer order assembly locations, each of said order assembly locations being separated from the operator;

a warehouse management system that is programmed to establish a queue of orders that are available to be filled, each order in the queue containing at least one unique item type;

said warehouse management system being programmed to select a first order from the order queue and open that order as a primary order and assigning the primary order to an order assembly location that is closest to an operator inventory container location for assembling of the primary order;

a material-handling system that is configured to deliver an inventory container having a first unique item type for the primary order to the inventory container location and directing an operator to pick at least one first unique item type from the inventory container and place the at least one first unique item type with the first order;

said warehouse management system being programmed to select a second order from the order queue and opening that order as a secondary order and assigning the secondary order at an order assembly location that is not closest to the operator inventory container location for at least partial assembling of the secondary order;

said material-handling system configured to deliver an inventory container having a second unique item type for the secondary order to the inventory container location and directing an operator to pick at least one second unique item type from the inventory container and place the at least one second unique item type with the secondary order; and said warehouse management system being programmed that when the first order is complete, designating the second order as the primary order and further assembling the second order in the assembly location that is closest to the operator inventory container location.

* * * * *